United States Patent
Liu et al.

(10) Patent No.: US 11,847,810 B2
(45) Date of Patent: Dec. 19, 2023

(54) FACE-HAND CORRELATION DEGREE DETECTION METHOD AND APPARATUS, DEVICE AND STORAGE MEDIUM

(71) Applicant: SENSETIME INTERNATIONAL PTE. LTD., Singapore (SG)

(72) Inventors: Chunya Liu, Singapore (SG); Xuesen Zhang, Singapore (SG); Bairun Wang, Singapore (SG); Jinghuan Chen, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 106 days.

(21) Appl. No.: 17/489,941

(22) Filed: Sep. 30, 2021

(65) Prior Publication Data

US 2023/0082671 A1  Mar. 16, 2023

Related U.S. Application Data

(63) Continuation of application No. PCT/IB2021/058762, filed on Sep. 26, 2021.

(30) Foreign Application Priority Data

Sep. 16, 2021 (SG) .......................... 10202110217V

(51) Int. Cl.
*G06V 10/25* (2022.01)
*G06N 3/08* (2023.01)
(Continued)

(52) U.S. Cl.
CPC ............ *G06V 10/25* (2022.01); *G06F 18/253* (2023.01); *G06N 3/08* (2013.01); *G06V 40/107* (2022.01);
(Continued)

(58) Field of Classification Search
CPC .... G06V 10/25; G06V 40/107; G06V 40/161; G06V 40/168; G06V 2201/07;
(Continued)

(56) References Cited

U.S. PATENT DOCUMENTS

| | | | | |
|---|---|---|---|---|
| 2009/0324008 A1* | 12/2009 | Kongqiao | ............... | G06F 3/017 382/103 |
| 2013/0106092 A1* | 5/2013 | Holmes | .................. | B42D 25/29 283/85 |

(Continued)

FOREIGN PATENT DOCUMENTS

| | | |
|---|---|---|
| CN | 113348465 A | 9/2021 |
| SG | 11202106831Q A | 7/2021 |

OTHER PUBLICATIONS

"Improving Facial Attribute Recognition by Group and Graph Learning", May 2021, Zhenghao Chen, Shuhang Gu, Feng Zhu, Jing Xu and Rui Xhao, IEEE International Conference on Multimedia and Expo (ICME), 6 pgs.

(Continued)

*Primary Examiner* — Nimesh Patel
(74) *Attorney, Agent, or Firm* — Cooper Legal Group, LLC

(57) ABSTRACT

Provided are a face-hand correlation degree detection method and apparatus, a device, and a storage medium. The method includes that: an image to be detected is acquired; a face feature set and a hand feature set of the image to be detected are determined on the basis of a result obtained by performing face and hand detection on the image to be detected; a first interaction feature of a target face is determined on the basis of a face feature of the target face and the hand feature set; a second interaction feature of a target hand is determined on the basis of a hand feature of the target hand and the face feature set; and a correlation between the hand feature and the face feature set; and a correlation between the (Continued)

target face and the target hand is determined on the basis of the first interaction feature and the second interaction feature.

20 Claims, 4 Drawing Sheets

(51) Int. Cl.
*G06V 40/10* (2022.01)
*G06V 40/16* (2022.01)
*G06F 18/25* (2023.01)

(52) U.S. Cl.
CPC .......... *G06V 40/161* (2022.01); *G06V 40/168* (2022.01); *G06V 2201/07* (2022.01)

(58) Field of Classification Search
CPC .... G06V 40/169; G06V 40/28; G06V 20/582; G06V 40/172; G06V 40/20; G06V 10/147; G06V 10/16; G06V 10/82; G06V 40/174; G06V 40/197; G06V 40/25; G06V 40/19; G06V 20/52; G06V 10/74; G06V 40/23; G06V 10/764; G06V 40/165; G06V 10/145; G06V 10/7715; G06V 2201/03; G06V 40/103; G06V 40/113; G06V 40/45; G06V 40/10; G06V 20/40; G06V 20/46; G06V 40/16; G06V 40/11; G06V 20/48; G06V 20/64; G06V 40/70; G06V 10/20; G06V 10/761; G06V 30/36; G06F 18/253; G06F 3/0346; G06F 3/012; G06F 3/013; G06F 3/017; G06F 2218/12; G06F 2203/011; G06F 21/32; G06F 2221/2111; G06F 21/554; G06F 21/552; G06F 3/0304; G06F 3/0481; G06F 18/00; G06F 16/583; G06F 18/2413; G06F 18/24; G06F 18/22; G06F 18/2431; G06F 18/241; G06F 18/23; G06F 18/2411; G06F 3/011; G06F 18/24147; G06F 3/0426; G06F 30/27; G06N 3/08; G06N 3/04; G06N 20/00; G06N 3/045; G06N 3/044; G06N 3/088; G06N 3/02; G06N 3/082; G06N 5/01; G06N 5/025; G06N 3/047; H04N 21/4728; H04N 21/441; H04N 21/44218; H04W 4/029; H04W 4/021; H04W 4/027; H04W 4/023; H04W 48/08; H04W 48/16; G06T 2207/30201; G06T 7/70; G06T 17/00; G06T 2207/10024; G06T 2207/10036; G06T 2207/20081; G06T 2207/20084; G06T 2207/30196; G06T 7/0012; G06T 7/80; G06T 2200/08; G06T 7/20; G06T 7/73; G06T 2207/10016; G06T 2207/30232; G06T 7/33; G06T 7/292

See application file for complete search history.

(56) References Cited

U.S. PATENT DOCUMENTS

| | | | |
|---|---|---|---|
| 2014/0062861 A1* | 3/2014 | Yamashita | G06F 3/011 382/103 |
| 2017/0316255 A1* | 11/2017 | Arata | G06V 40/172 |
| 2020/0250803 A1* | 8/2020 | Gu | G06V 20/40 |
| 2021/0056804 A1* | 2/2021 | Eager | G07F 17/3239 |
| 2021/0201478 A1* | 7/2021 | Zhang | G06T 7/0012 |
| 2021/0271892 A1* | 9/2021 | Luo | G06V 10/754 |

OTHER PUBLICATIONS

Written Opinion of the Singaporean application No. 10202110217V, dated Nov. 16, 2021, 9 pgs.

* cited by examiner

FACE-HAND CORRELATION DEGREE DETECTION METHOD AND APPARATUS, DEVICE AND STORAGE MEDIUM

CROSS-REFERENCE TO RELATED APPLICATION(S)

The application is continuation of international application PCT/IB2021/058762, filed on 26 Sep. 2021, which claims priority to Singapore patent application No. 10202110217V, filed with IPOS on 16 Sep. 2021. The contents of international application PCT/IB2021/058762 and Singaporean patent application No. 10202110217V are incorporated herein by reference in their entireties.

TECHNICAL FIELD

Embodiments of the present application relate to the technical field of image processing, and relate to, but are not limited to, a face-hand correlation degree detection method and apparatus, a device, and a storage medium.

BACKGROUND

The relationship analysis between objects based on images or videos is an important application scenario of computer vision. The relationship analysis between body parts aims to determine whether the body parts appearing in the images belong to the same human body or not, especially in the relationship analysis between a face and a hand, the identity of a person performing a specific operation can be determined on the basis of the action of the hand and the relationship between the hand and the face.

In a complex scene with many people, a person may be occluded by another person, or arms may be staggered. In the related art, a trained neural network is configured to extract visual features of a face region and visual features of a hand region, and then predict the correlation degree of the face and the hand, so as to judge whether the face and the hand belong to the same human body. The prediction accuracy of the method for the correlation degree of the hand and the face is to be improved.

SUMMARY

The embodiments of the present application provide a face-hand correlation degree detection method.

The embodiments of the present application provide a face-hand correlation degree detection method, which may include the following operations.

An image to be detected is acquired.

A face feature set and a hand feature set of the image to be detected are determined on the basis of a result obtained by performing face and hand detection on the image to be detected. Each face feature in the face feature set corresponds to one face in a picture of the image to be detected. Each hand feature in the hand feature set corresponds to one hand in the picture of the image to be detected.

A first interaction feature of a target face is determined on the basis of a face feature of the target face and the hand feature set. The target face is any face in the picture of the image to be detected.

A second interaction feature of a target hand is determined on the basis of a hand feature of the target hand and the face feature set. The target hand is any hand in the picture of the image to be detected.

The correlation degree between the target face and the target hand is determined on the basis of the first interaction feature and the second interaction feature.

In some embodiments, the operation that a face feature set and a hand feature set of the image to be detected are determined on the basis of a result obtained by performing face and hand detection on the image to be detected may include: a face detection box of each face and a hand detection box of each hand in the picture of the image to be detected are determined on the basis of the result obtained by performing face and hand detection on the image to be detected; a feature of each face is extracted based on the face detection box of each face to obtain the face feature set; and a hand of each hand is extracted based on the hand detection box of each hand to obtain the hand feature set. Thus, the accuracy of target detection for the face and the hand in the image to be detected can be improved.

In some embodiments, the operation that a first interaction feature of a target face is determined on the basis of a face feature of the target face and the hand feature set may include that: a first undirected graph is constructed on the basis of the target face and the each hand in the picture, the first undirected graph including a first node corresponding to the target face, a second node in one-to-one correspondence with each hand, and a first side in one-to-one correspondence with the second node, each first side being configured to connect the first node and one of the second nodes; a first correlation degree between a hand feature of the hand corresponding to the second node connected to each first side and the face features of the target face in the first undirected graph is determined; and the first interaction feature is determined on the basis of the face feature of the target face, the hand feature of each hand in the picture, and the corresponding first correlation degree. Thus, a plurality of hand features around the target face in the image to be detected are fused into the face features, which is beneficial to improving the accuracy of correlating the target face and the hand.

In some embodiments, the operation that the first correlation degree between a hand feature of the hand corresponding to the second node connected to each first side and the face feature of the target face in the first undirected graph is determined may include that: a first confidence degree that the hand corresponding to the second node connected to each first side and the target face belong to the same body is determined on the basis of the hand feature of the hand corresponding to the second node connected to each first side and the face feature of the target face; the first confidence degree that the hand corresponding to the second node connected to each first side and the target face in the first undirected graph belong to the same body is normalized, to obtain the first correlation degree between the hand feature of the hand corresponding to the second node connected to each first side and the face feature of the target face. Thus, the correlation degree between the hand on each first side and the target face can be predicted more accurately by inputting the first undirected graph into a GAT (Graph Attention Network).

In some embodiments, the operation that the first interaction feature is determined on the basis of the face feature of the target face, the hand feature of each hand in the picture, and the corresponding first correlation degree may include: the hand feature of each hand are adjusted on the basis of the first correlation degree corresponding to each hand, to obtain an adjusted feature of each hand; and the adjusted features of each hand in the picture and the face feature in the target face are fused, so as to obtain the first interaction feature. Thus, the accuracy of the correlation degree between the target face and the target hand can be optimized.

In some embodiments, the operation that a second interaction feature of a target hand is determined on the basis of a hand feature of the target hand and the face feature set may include that: a second undirected graph is constructed on the basis of the target hand and each face in the picture, the second undirected graph including a third node corresponding to the target hand, a fourth node in one-to-one correspondence with each face, and a second side in one-to-one correspondence with the fourth node, each second side being configured to connect the third node and one of fourth nodes; a second correlation degree between a face feature of the face corresponding to the fourth node connected to each second side and the hand feature of the target hand in the second undirected graph is determined; and the second interaction feature is determined on the basis of the hand feature of the target hand, the face feature of each face in the picture, and the corresponding second correlation degree. Thus, for each hand of the plurality of hands, weighted fusion is performed on the hand feature of the target hand, the face features of in the image, and the features of other body parts, so that the obtained second interaction feature can effectively represent surrounding information of the target hand.

In some embodiments, the operation that the second correlation degree between a face feature of the face corresponding to the fourth node connected to each second side and the hand feature of the target hand in the second undirected graph is determined may include that: a second confidence degree that the face corresponding to the fourth node connected to each second side and the target hand belong to the same body is determined on the basis of the face features of the face corresponding to the fourth node connected to each second side and the hand feature of the target hand; the second confidence degree that the face corresponding to the fourth node connected to each second side and the target hand in the second undirected graph belong to the same body is normalized, to obtain the second correlation degree between the face feature of the face corresponding to the fourth node connected to each second side and the hand feature of the target hand. Thus, the correlation degree between the face on each second side and the target hand can be predicted more accurately by inputting the second undirected graph into the GAT.

In some embodiments, the operation that the second interaction feature is determined on the basis of the hand feature of the target hand, the face feature of each face in the picture, and the corresponding second correlation degree may include: the face feature of each face is adjusted on the basis of the second correlation degree corresponding to each face, to obtain an adjusted feature of each face; and the adjusted features of each face in the picture and the hand feature in the target hand are fused, so as to obtain the second interaction feature. Thus, the accuracy of the correlation degree between the target face and the target hand can be optimized.

In some embodiments, the operation that a correlation degree between the target face and the target hand is determined on the basis of the first interaction feature and the second interaction feature includes that: a third confidence degree that the target face and the target hand belong to the same body is determined on the basis of the first interaction feature and the second interaction feature; and the third confidence degree is determined as the correlation degree between the target face and the target hand. Thus, the prediction accuracy of a correlation result between the target face and the target hand in the image to be detected can be improved by predicting whether the target face and the target hand belong to the same body by using two fully connected layers in series.

In some embodiments, in a case where the image to be detected further includes other body parts, the method further includes that: a body feature set of other body parts of the image to be detected is determined on the basis of a result obtained by performing detection of the other body parts on the image to be detected, each body feature in the body feature set corresponding to one of the other body parts in a picture of the image to be detected. The operation that a first interaction feature of the target face is determined on the basis of a face feature of the target face and the hand feature set includes that: the first interaction feature is determined on the basis of the face feature of the target face, the body feature set, and the hand feature set. The operation that a second interaction feature is determined on the basis of a hand feature of the target hand and the face feature set includes that: the second interaction feature is determined on the basis of the hand features of the target hand, the body feature set, and the face feature set. Thus, the first interaction feature and the second interaction feature can represent features of other body parts in the image more effectively.

The embodiments of the present application provide a face-hand correlation degree detection apparatus, which may include a first acquisition module, a first determination module, a second determination module, a third determination module, and a fourth determination module.

The first acquisition module is configured to acquire an image to be detected.

The first determination module is configured to determine a face feature set and a hand feature set of the image to be detected on the basis of a result obtained by performing face and hand detection on the image to be detected. Each face feature in the face feature set corresponds to one face in a picture of the image to be detected. Each hand feature in the hand feature set corresponds to one hand in the picture of the image to be detected.

The second determination module is configured to determine a first interaction feature of a target face on the basis of a face feature of the target face and the hand feature set. The target face is any face in the picture of the image to be detected.

The third determination module is configured to determine a second interaction feature of a target hand on the basis of a hand feature of the target hand and the face feature set. The target hand is any hand in the picture of the image to be detected.

The fourth determination module is configured to determine a correlation between the target face and the target hand on the basis of the first interaction feature and the second interaction feature.

The embodiments of the present application provide a computer storage medium. The computer storage medium stores a computer executable instruction. The computer executable instruction is executed to implement the above-mentioned face-hand correlation degree detection method.

The embodiments of the present application provide a computer device. The computer device includes a memory and a processor. The memory stores a computer executable instruction. The processor executes the computer executable instruction on the memory to implement the above-mentioned face-hand correlation degree detection method.

According to the face-hand correlation degree detection method and apparatus, the device, and the storage medium provided by the embodiments of the present application, feature extraction is first performed on the acquired image to be detected including faces and hands to obtain the face feature set and the hand feature set. Then, for any target face of the faces, the first interaction feature that can represent the hand features around the target face can be obtained by fusing the hand feature set of the hand in the image. Meanwhile, the second interaction feature that can represent the face features around the target hand is obtained by fusing the face feature set of the faces in the image. Finally, the correlation degree of the target face and the target hand can be predicted more accurately through the first interaction feature and the second interaction feature including the features representing surrounding information.

DETAILED DESCRIPTION

Figure 1:
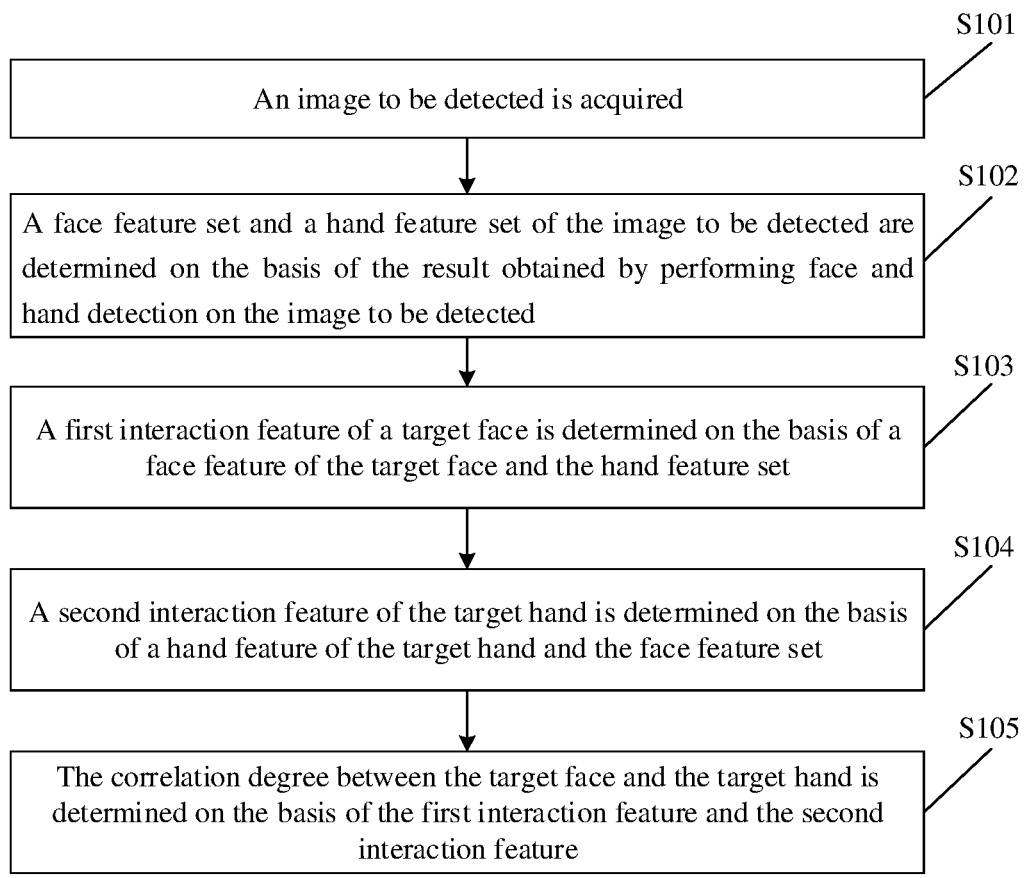
FIG. 1 is an implementation flowchart of a face-hand correlation degree detection method according to an embodiment of the present application.

The following embodiments are used to describe the present application rather than limiting the scope of the present application.

"Some embodiments" involved in the following descriptions describes a subset of all possible embodiments. However, it can be understood that "some embodiments" may be the same subset or different subsets of all the possible embodiments, and may be combined without conflicts.

The term "first/second/third" involved in the description below is only for distinguishing similar objects and does not represent a specific sequence of the objects. It can be understood that "first/second/third" may be interchanged to specific sequences or orders if allowed to implement the embodiments of the present application described herein in sequences except the illustrated or described ones.

Unless otherwise defined, all technical and scientific terms used herein shall have the same meanings as commonly understood by those skilled in the art to which this application belongs. The terms used herein are only intended to describe the embodiments of the present application, and are not intended to limit the present application.

Before further describing the embodiments of the present application in detail, nouns and terms involved in the embodiments of the present application are described. The nouns and terms involved in the embodiments of the present application are applicable to the following explanations.

1) Computer vision is a science that studies how to make a machine "see", which refers to identifying, tracking, and measuring a target by using a camera and computer instead of human eyes, and further performing image processing.

2) Training data of the GAT is a graph, not the previous data directly represented arbitrarily by Euclidean space. The simplest input data also includes an adjacency matrix and a node feature, and the node of the graph is not only weighting, but also many features. As a representative graph convolution network, the GAT introduces an attention mechanism to achieve better neighbor aggregation. The GAT can realize weighted aggregation of neighbors by learning the weight of the neighbors. Therefore, the GAT is not only robust to noisy neighbors, but also the attention mechanism gives a model certain interpretability.

3) A Feature Pyramid Network (FPN) is a network, which mainly solves a multi-scale in object detection. Prediction is performed independently in different feature layers, and the performance of small object detection is greatly improved under the condition of not increasing the calculation amount of the original model basically through simple network connection.

Exemplary applications of a face-hand correlation degree detection device provided by the embodiments of the present application. The device provided by the embodiments of the present application may be implemented as various types of user terminals, such as a notebook computer, a tablet computer, a desktop computer, a camera, a mobile device (for example, a personal digital assistant, a special message device, and a portable game device) with an image collection function, and may also be implemented as a server. An exemplary application when the device is implemented as a terminal or a server will be described below.

The method may be applied to a computer device. The function realized by the method can be realized by calling program codes by the processor in the computer device. Of course, the program codes can be stored in the computer storage medium. It can be seen that the computer device at least includes a processor and a storage medium.

The embodiments of the present application provide a face-hand correlation degree detection method, as shown in FIG. 1, is described in combination with the steps as shown in FIG. 1.

At S101, an image to be detected is acquired.

In some embodiments, the image to be detected may be a color image, or may also be a gray image. Faces and hands may be located in a foreground region, a medium shot region, and a background region of the image to be detected. A picture of the image to be detected includes at least one person and at least one hand. The face in the image to be detected refers to the picture that can present all or part of face information in the image to be detected. Correspondingly, the hand in the image to be detected may refer to left hand information, right hand information, left and right hand information, etc., presented in the image to be detected. The image to be detected may be image collected in any scenario, for example, the image collected in a game place including a plurality of players and player hands. The face is the face of the player, and the hand is the hand of the player. There is at least one face and at least two hands in the image to be detected.

In some embodiments, the state of the at least one face presented in the image to be detected may be: a complete face, a half face, a clear or unclear face, etc. Correspondingly, the state of the hand presented in the image to be detected may be: open or closed, and may also be partially closed, etc.

In some embodiments, the image content of the image to be detected includes, but not limited to, the face and the hand. For example, the image to be detected may also include other body parts (for example, a wrist, an elbow, a waist, a neck, etc.). The image to be detected may be that the face and the hand in the image content are located in the same scenario, for example, a classroom, a park, an office, or a game place. Meanwhile, the image content in the image to be detected may include one, two or more than two faces and hands. Correspondingly, a relative positional relationship between the face and the hand in the image content of the image to be detected may be left-right, front-back, one under the other, etc.

At S102, a face feature set and a hand feature set of the image to be detected are determined on the basis of the result obtained by performing face and hand detection on the image to be detected.

In some embodiments, the face detection and hand detection is performed on the image to be detected to obtain the result of the face and hand detection on the image to be detected, a detected face is marked by using a body detection box, and a detected hand is marked by using a hand detection box. Each face feature in the face feature set corresponds to one face in the picture of the image to be detected. Each hand feature in the hand feature set corresponds to one hand in the picture of the image to be detected. In some possible implementation manners, first, a face detection box of each face and a hand detection box of the hand in the image to be detected are predicted by using a detection model; and then, feature extraction is performed on each face detection box and each hand detection frame to obtain a face feature set and a hand feature set. If the image to be detected further includes body parts other than face and hand, body detection boxes of the other body parts are predicted by using a detection model to obtain a body feature set.

In some possible implementation manners, firstly, image information of an image to be detected is extracted by adopting a backbone network to generate a feature graph. The backbone network may include a convolution module for performing convolution processing on the image. Secondly, the feature map is input into a feature pyramid network to obtain image features with different resolutions. Thirdly, the image features with different resolutions are input into a region generation network, so as to determine region candidates in the image to be detected. Finally, the region candidates are input into Regions with CNN (RCNN) with convolution neural network features to obtain a face detection box of the face and a hand detection box of the hand in each region candidate, and feature extraction is performed on the face and the hand in the detection boxes to obtain a face feature set and a hand feature set. The above-mentioned backbone network, the FPN, and the RCNN may be trained neural networks.

At S103, a first interaction feature of a target face is determined on the basis of a face feature of the target face and the hand feature set.

In some embodiments, the target face is any face in the picture of the image to be detected. The features of the target face and the hand features of each hand included in the image to be detected are fused in a manner of splicing, superposing, etc. to obtain a first interaction feature. If the image to be detected further includes other body parts, then the features of the other body parts and the hand features of each hand are fused into the face features of a target face to obtain a first interaction feature, so that the first interaction feature can effectively express the body information around the target face.

In some possible implementation manners, an undirected graph is constructed by taking the target face as a central node and connecting the central node representing the target face and a node representing each hand. The constructed undirected graph is taken as an input of the GAT, and the GAT determines the correlation degree between each hand and the target face for each side in the undirected graph, so that all hands in the image to be detected are fused with the target face through the correlation degree to obtain the first interaction feature.

At S104, a second interaction feature of the target hand is determined on the basis of a hand feature of the target hand and the face feature set.

In some embodiments, the target hand is any hand in the picture of the image to be detected. A second interaction feature is obtained by fusing the features of the target hand and the face features of each face included in the image to be detected. If the image to be detected further includes other body parts, then the features of the other body parts and the face features of each face are fused into the hand features of the target hand to obtain the second interaction feature, so that the second interaction feature can effectively express the face features and identity information around the target face.

In some possible implementation manners, an undirected graph is formed by taking the target hand as a central node and connecting the central node representing the target hand and a node representing each face. The constructed undirected graph is taken as an input of the GAT, and the GAT determines the correlation degree between each face and the target hand for each side in the undirected graph, so that all faces in the image to be detected are fused with the target hand through the correlation degree to obtain the second interaction feature.

At S105, a correlation degree between the target face and the target hand is determined on the basis of the first interaction feature and the second interaction feature.

In some embodiments, the first interaction feature output by the GAT and the second interaction feature output by another GAT are input into a Pair head to predict whether the first interaction feature and the second interaction feature belong to the same body, so as to obtain a correlation degree representing whether the target face and the target hand belong to the same body. The Pair head may be a neural network for classifying, and it may be trained in advance.

In some possible implementation manners, the Pair head is realized by using two layers of fully connected layers, i.e., the two layers of fully connected layers are connected in series. The input first interaction feature and the second interaction feature are subjected to two consecutive fully connected layer processes, and then a correlation result between the first interaction feature and the second interaction feature is predicted through an activation function.

In the embodiments of the present application, first, a face feature set and a hand feature set are determined for an acquired image to be detected by performing face and hand detection on the image to be detected. Then, for any target face of the faces, a first interaction feature that can represent the hand features around the target face can be obtained by fusing the hand feature set of the hand in the image. Meanwhile, the second interaction feature that can represent the face features around the target hand is obtained by fusing the face feature set of the faces in the image. Finally, the correlation degree of the target face and the target hand can be predicted more accurately through the first interaction feature and the second interaction feature that represent information features around a body.

In some embodiments, in order to improve the accuracy of performing feature extraction on the face and the hand in the image to be detected, the detection boxes of the face and the hand in the image to be detected are predicted by using the RCNN network, so as to obtain the face features and the hand features. That is, the above-mentioned S102 may be implemented by the following steps.

At S121, a face detection box of each face and a hand detection box of each hand in the picture of the image to be detected are determined on the basis of a result obtained by performing the face and hand detection on the image to be detected.

In some embodiments, first, an image feature of the image to be detected is extracted by using a backbone network, so as to generate an image feature map. Then, the image feature map is input into the FPN, so that a plurality of image features with different resolutions can be obtained. Finally, the plurality of image features with different resolutions are into the RCNN to perform face and hand detection, so as to detect a face detection box of each face and a hand detection box of each hand.

At S122, a feature of each face is extracted based on the face detection box of each face to obtain the face feature set.

In some embodiments, feature extraction is performed on an image region marked by the face detection box, so as to obtain face features. Thus, feature extraction is performed on an image region where the face detection box of each face is located, so as to obtain a face feature set.

At S123, a feature of each hand is extracted based on the hand detection box of each hand to obtain the hand feature set.

In some embodiments, feature extraction is performed on an image region marked by the hand detection box, so as to obtain hand features. Thus, feature extraction is performed on an image region where the hand detection box of each hand is located, so as to obtain a hand feature set. Thus, the image features with different resolutions output by the FPN are taken as an input of the RCNN, so as to predict detection boxes of the face and the hand in the image to be detected, thereby improving the accuracy of target detection on the face and the hand in the image to be detected.

Figure 2:
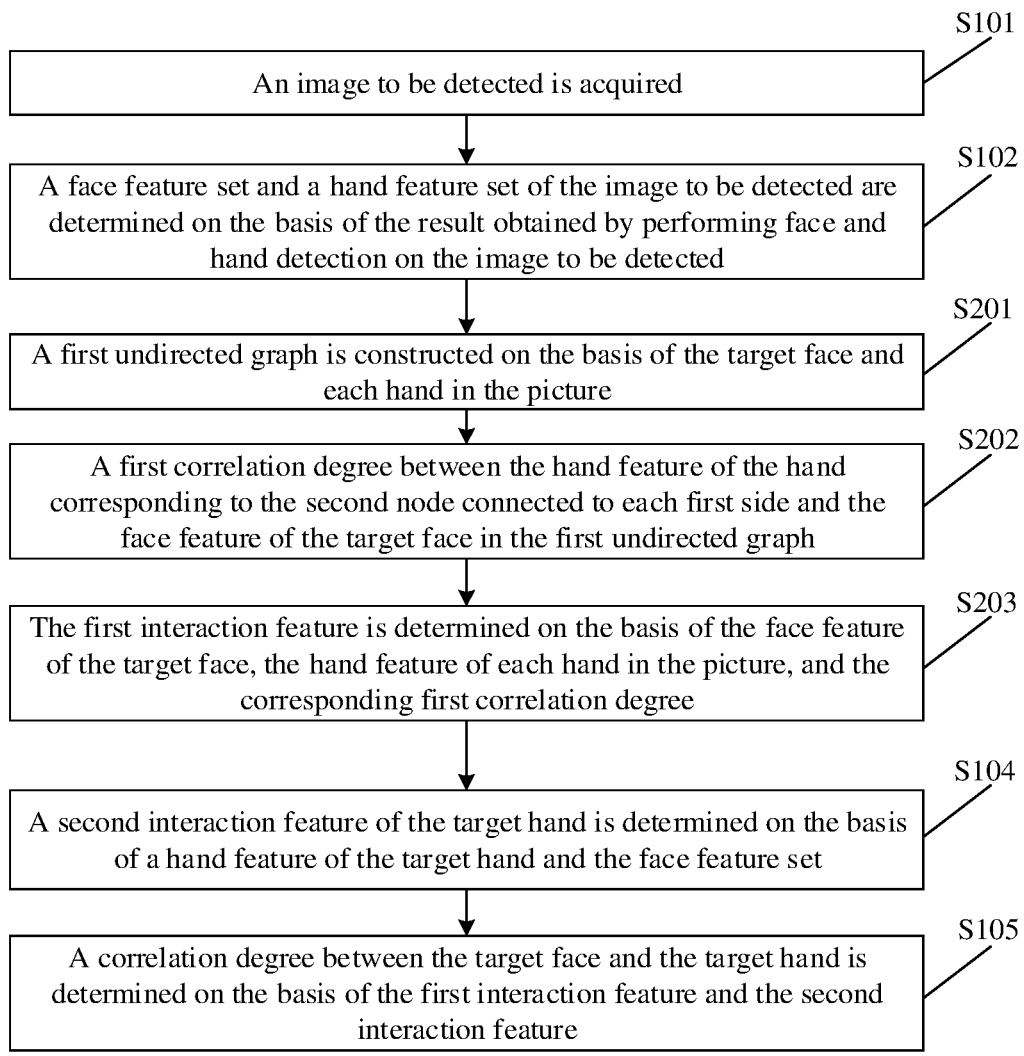
FIG. 2 is another implementation flowchart of a face-hand correlation degree detection method according to an embodiment of the present application.

In some embodiments, a first undirected graph is constructed according to a face detection box and a hand detection box detected by the RCNN, so that more features of other body parts in the image can be fused for the face features of the target face by using the GAT. That is, the above-mentioned S103 may be implemented through the steps shown in FIG. 2. FIG. 2 is another implementation flowchart of a face-hand correlation degree detection method according to an embodiment of the present application. The following description will be made with reference to FIG. 1 and FIG. 2.

At S201, a first undirected graph is constructed on the basis of the target face and each hand in the picture.

In some embodiments, the first undirected graph includes a first node corresponding to the target face, a second node in one-to-one correspondence with each hand, a first side in one-to-one correspondence with the second node. Each first side is configured to connect the first node and one of second nodes. A face detection box of the target face is taken as a center, i.e., a first node, a hand detection box of each hand is taken as a second node, the first node is connected to the second node of each hand to form a plurality of first side, so as to obtain the first undirected graph. In some possible implementation manners, a target face and each hand are taken as a node, i.e., how many hands are included in the image to be detected, how many second nodes of the hand are set. If the image to be detected further includes other body parts, then the other body part is also taken as a node.

Thus, a first undirected graph is constructed by taking the first node of the target face as a center and respectively connecting the second node of each hand and the nodes of other body parts. Thus, one of the two ends of each first side in the undirected graph is a first node of the target face, and the other end is a first node of a hand or a node of the other body parts. Therefore, the hand features and the features of various body parts in the image to be detected can be considered more fully for the target face in the constructed first undirected graph.

At S202, a first correlation degree between the hand feature of the hand corresponding to the second node connected to each first side and the face feature of the target face in the first undirected graph.

In some embodiments, the first undirected graph is input into a trained GAT. For each first side in the first undirected graph, the confidence degree that the target face and the hand at the two ends of the first side is predicted through a fully connected layer of the GAT and an activation function. The confidence degree is normalized through a normalization function in the GAT, so as to obtain a first correlation degree.

In some possible implementation manners, the correlation degree between two nodes on any first side in the first undirected graph is predicted by using the GAT, i.e., the above-mentioned S202 may be implemented by S221 and S222 (not shown in the drawings) as follows.

At S221, a first confidence degree that a hand corresponding to a second node connected to each first side and the target face belong to the same body is determined on the basis of the hand feature of the hand corresponding to the second node connected to each first side and the face feature of the target face.

In some embodiments, for each first side, the hand features and the face features of the target face at the two ends of the side are input into a fully connected layer and a preset activation function of the GAT for processing, so as to determine the first confidence degree that the hand and the target face on the first side belong to the same body. In some possible implementation manners, the preset activation function may be a leaky activation function. The features output by the fully connected layer are input into the leaky activation function. First, feature transformation is performed on the hand features of the hand corresponding to the second node connected to each first side and the face features of the target face by using the fully connected layer, for example, multi-dimensional face features and hand features are transformed into one-dimensional features. Then, the transformed face features and hand features are input into the leaky activation function to predict the first confidence degree that the hand corresponding to the second node and the target face belong to the same body. For example, whether the hand features and the face features of the target face belong to the same body is classified by using the fully connected layer and the preset activation function, so as to obtain the confidence degree that the hand features and the face features of the target face belong to the same body. For example, taking the dimensions of both the face features and the hand feature are 3136, for each first side, the input is the face features and the hand features, i.e., the input feature dimension is 2*3136. Convolution computation is performed on 2*3136 face features and hand features by using the fully connected layer, so as to output the features with the dimension of 1*3136. The 1*3136 features are input into the preset activation function to predict the first confidence degree that the hand on the first side and the target face belong to the same body.

At S222, the first confidence degree that the hand corresponding to the second node connected to each first side in the first undirected graph and the target face belong to the same body is normalized to obtain a first correlation degree between the hand feature of the hand corresponding to the second node connected to each first side and the face feature of the target face.

In some possible implementation manners, the first confidence degree may be mapped between (0, 1) by using a normalization function (for example, softmax), so as to realize normalization of the first confidence degree, and obtain a first correlation degree of each first side. For example, there are 5 hands and 6 other body parts in the image to be detected, then in the constructed first undirected graph, a first node representing a target face is taken as a center to respectively connect second nodes of 5 hands and nodes of 6 other body parts to obtain 11 first sides, i.e., the 11 first sides are respectively connected to the second nodes corresponding to the 5 hands and the nodes corresponding to 6 other body parts, and a first correlation degree is determined for each first side in the 11 first sides.

At S203, the first interaction feature is determined on the basis of the face feature of the target face, the hand feature of each hand in the picture, and the corresponding first correlation degree.

In some embodiments, on each first side, first, the first correlation degree corresponding to the first side is multiplied by the hand features of a node corresponding to an end point (or other body parts). Then, element-by-element summation is performed on multiplication results of a plurality of first sides. Finally, the summed result and the face features are summed again, and a summed average value is taken as a first interaction feature, so that the information around the target face in the image (for examples, hands or other body parts around the target face) can be effectively represented in the first interaction feature. Thus, a plurality of hand features around the target face in the image to be detected are all fused into the face features, so that the first interaction feature can represent the image information around the target face in the image, which is beneficial to improving the accuracy of correlating the target face and the hand.

In some possible implementation manners, hand features of each hand and face features of a target face in a first undirected graph are fused to obtain a first interaction feature. That is, the above-mentioned S203 may be implemented by S231 and S232 (not shown in the drawings) as follows.

At S231, the hand feature of each hand is adjusted on the basis of the first correlation degree corresponding to each hand to obtain an adjusted feature of each hand.

Here, element-by-element multiplication is performed on the first correlation degree of the first side and the hand features (or other body parts) of an end point, so as to obtain adjusted features of the hand. Thus, adjusted features of the hand on the first side can be obtained for each first side in the first undirected graph. For example, in a case where the image to be detected further includes other body parts, the adjusted features of other body parts connected to a certain first side in the first undirected graph can also be obtained.

At S232, the adjusted feature of each of the hands in the picture and the face feature of the target face are fused to obtain the first interaction feature.

Here, in a case where the image to be detected further includes body parts other than face and hand, the adjusted features of each hand in the picture and the adjusted features of the other body parts are fused into the face features of the target face, so as to obtain the first interaction feature. For example, first, element-by-element summation is performed on the adjusted features of each hand in the picture, and the element-by-element summation is performed on the adjusted features of other body parts. Then, the element-by-element summation is performed on the two summation results and the face features of the target face, and an average value is solved to obtain a first interaction feature. Thus, weighting among nodes of various parts of a body is performed on the features of the face and the hand by using the GAT, so that the features of the face and the hand represent the information around the body more effectively, thereby optimizing the accuracy of the correlation degree between the target face and the target hand.

In some embodiments, a second undirected graph is constructed according to a face detection box and a hand detection box detected by the RCNN, so that more features of other identity parts in the image may be fused for the hand features of the target hand by using the GAT. That is, the above-mentioned S104 may be implemented by S141 to S143 (not shown in the drawings) as follows.

At S141, a second undirected graph is constructed on the basis of the target face and each face in the picture.

In some possible embodiments, face detection boxes of each face in an image are connected to obtain the second undirected graph by taking a hand detection box of a target hand as a center. The second undirected graph includes a third node corresponding to the target hand, a fourth node in one-to-one correspondence with each face, a second side in one-to-one correspondence with the fourth node. Each of the second sides is configured to connect the third node and one of fourth nodes. The method for constructing the second undirected graph is similar to that for constructing the first undirected graph. That is, the second undirected graph is constructed in a method similar to S201. For example, a hand and a face in an image to be detected are detected by an RCNN to obtain a hand detection box and a face detection box. Both the hand and the face in the image are set as nodes. If the image to be detected further includes other body parts, the other body parts are also set as nodes. A third node for representing the hand detection box of the target hand is taken as a center, and the face detection box of each face is taken as a fourth node, the third node is connected to each of the fourth nodes, so as to form a plurality of sides, i.e., second sides, and obtain the second undirected graph.

At S142, a second correlation degree between a face feature of the face corresponding to the fourth node connected to each second side and the hand feature of the target hand in the second undirected graph in the second undirected graph is determined.

In some embodiments, the second undirected graph is input into a trained GAT. For each second side in the second undirected graph, the confidence degree that a target hand and a hand at the two ends of the second side belong to the same body is predicted through a fully connected layer of the GAT and a leaky activation function (if the image to be detected further includes other body parts, the confidence degree that the target hand and the other body parts belong to the same body is determined). The confidence degree is normalized through a normalization function in the GAT, so as to obtain a second correlation degree that the target hand on each second side and the face or the other body parts belong to the same body.

In some possible implementation manners, the correlation degree between two nodes on any second side in the second undirected graph is predicted by using the GAT, i.e., the above-mentioned S142 may be implemented by the following steps.

In a first step, a second confidence degree that a face corresponding to a fourth node connected to each second side and a target hand belong to the same body is determined on the basis of face features of the face corresponding to the fourth node connected to each second side and hand features of the target hand.

In some possible embodiments, for each second side, the face features and the hand features of the target hand corresponding to nodes at two ends of the second side are input into a fully connected layer and a preset activation function of the GAT for processing, so as to determine the second confidence degree that the hand and the face on the first side belong to the same body. In some possible implementation manners, first, feature transformation is performed on face features of a face corresponding to a fourth node connected to each second side and the hand features of the target hand by using the fully connected layer. Then, the transformed face features and hand features are input into a leaky activation function to predict a second confidence degree that the face corresponding to the fourth node and the target hand belong to the same body.

In a second step, the second confidence degree that a face corresponding to a fourth node connected to each second side and the target hand in the second undirected graph belong to the same body is normalized, so as to obtain a second correlation degree between the face features of the face corresponding to the fourth node connected to each second side and the hand features of the target hand.

In some possible implementation manners, the second confidence degree may be mapped between (0, 1) by using a normalization function (for example, softmax), so as to realize the normalization of the second confidence degree, and obtain a second correlation degree of each second side. For example, there are 2 faces and 4 other body parts in the image to be detected, then in the constructed second undirected graph, a third node representing a target hand is taken as a center to respectively connect fourth nodes of 2 faces and 4 nodes of the other body parts to obtain 6 second sides, and a second correlation degree is determined for each second side in the 6 second sides.

At S143, a second interaction feature is determined on the basis of the hand feature of the target hand, the face feature of each face in the picture, and the corresponding second correlation degree.

In some embodiments, on each second side of the second undirected graph, first, the second correlation degree corresponding to the second side is multiplied by the face features (or other body parts) of a node corresponding to an end point of a second side. Then, element-by-element summation is performed on multiplication results of a plurality of second sides. Finally, the summed result and the hand features are summed again, and a summed average value is taken as a second interaction feature, so that the information around the target hand in the image (for examples, faces or other body parts around the target hand) can be effectively represented in the second interaction feature. Thus, a plurality of face features around the target hand in the image to be detected are all fused into the hand features, so that the second interaction feature can represent the image information around the target face in the image, which is beneficial to improving the accuracy of correlating the target face and the hand.

In some possible implementation manners, the face feature of each face and the hand feature of a target hand in a second undirected graph are fused to obtain a second interaction feature, i.e., the above-mentioned S143 may be implemented by the following steps.

In a first step, the face features of each face are adjusted on the basis of the second correlation degree corresponding to each face, so as to obtain adjusted features of each face.

In some possible implementation manners, element-by-element multiplication is performed on the second correlation degree corresponding to the second side and the face features (or other body parts) of an end point, so as to obtain adjusted features of the face. Thus, adjusted features of the face on the second side can be obtained for each second side in the second undirected graph. In a case where the image to be detected further includes other body parts, the adjusted features of other body parts connected to a certain second side in the second undirected graph can also be obtained.

In a second step, the adjusted features of each of the faces in the picture and the hand features of the target hand are fused to obtain the second interaction feature.

In some possible implementation manners, in a case where the image to be detected further includes other body parts, the adjusted features of each face in the picture and the adjusted features of the other body parts are fused into the hand features of the target hand, so as to obtain the second interaction feature. For example, first, element-by-element summation is performed on the adjusted features of each face in the picture, and the element-by-element summation is performed on the adjusted features of other body parts. Then, the element-by-element summation is performed on the two summation results and the hand features of the target hand, and an average value is solved to obtain a second interaction feature. Thus, weighting among nodes of various parts of a body is performed on the features of the face and the hand by using the GAT, so that the features of the face and the hand represent the information around the body more effectively, thereby optimizing the accuracy of the correlation degree between the target face and the target hand.

In the embodiments of the present application, for each hand of a plurality of hands, weighted fusion is performed on the hand features of the target hand, the face features of in the image, and the features of other body parts by using the GAT, so that the obtained second interaction feature can effectively represent surrounding information of the target hand.

In some embodiments, the correlation degree between the target face and the target hand is predicted by using a Pair head consisting of two fully connected layers. I.e., the above-mentioned S105 may be implemented through S151 and S152 (not shown in the drawings) as follows.

At S151, a third confidence degree that the target face and the target hand belong to the same body is determined on the basis of the first interaction feature and the second interaction feature.

In some embodiments, first, the third confidence degree that the first interaction feature and the second interaction feature belong to the same body is determined by using two fully connected layers in series and a corresponding activation function. The first interaction feature and the second interaction feature output by the GAT are input into the Pair head. The Pair head consists of a first fully connected layer and a second fully connected layer that are connected in series. A body to which the first interaction feature and the second interaction feature belong is subjected to operations, such as dimension reduction and connection, by using the first fully connected layer. An output feature of the first fully connected layer is taken as the input of an activation function corresponding to the layer, and a first classification result of the output feature of the first fully connected layer is determined by using the activation function. The first classification result includes the probability that a target face corresponding to the first interaction feature belongs to each body in the image, and the probability that a target hand corresponding to the second interaction feature belongs to each body in the image. Then, the first classification result is input into the second fully connected layer. The first classification result is subjected to the operations, such as dimension reduction and connection, by using the second fully connected layer, so as to obtain an output result of the second fully connected layer. The output result is input into an activation function corresponding to the second fully connected layer, and the feature output by the second fully connected layer is converted into a third confidence coefficient corresponding to each category by using the activation function.

At S152, the third confidence degree is determined as the correlation degree between the target face and the target hand.

In some embodiments, the confidence degree that the first interaction feature and the second interaction feature output by the second fully connected layer of the two fully connected layers connected in series belong to the same body is taken as the confidence degree that the target face and the target hand belong to the same body, so that the correlation degree between the target face and the target hand is determined.

In the embodiments of the present application, the prediction accuracy of a correlation result between the target face and the target hand in the image to be detected can be improved by predicting whether the target face and the target hand belong to the same body by using two fully connected layers in series.

In some embodiments, in a case where the image to be detected further includes body parts other than face and hand, features of other body parts are fused in both of the first interaction feature and the second interaction feature. The first interaction feature and the second interaction feature may be determined by the following steps.

In a first step, a body feature set of other body parts of an image to be detected is determined on the basis of a result obtained by performing other body part detection on the image to be detected.

Here, each body feature in the body feature set corresponds to one other body part in a picture of the image to be detected. In a case where the image to be detected further includes other body parts, the hand, the face, and the other body parts in the image to be detected are detected by using the RCNN, so that a hand detection box, a face detection box, and another body part detection box are obtained, and then a hand feature set, a face feature set, and a body feature set can be obtained by extracting features in the detection boxes.

In a second step, a first interaction feature is determined on the basis of face features of the target face, the body feature set, and the hand feature set.

Here, in a case where the image to be detected further includes other body parts, for each face, the face is taken as a target face, a node corresponding to the target face is taken as a center, each hand is connected to each of the nodes corresponding to other body parts, so as to construct a first undirected graph. The first undirected graph is input into a GAT, and body features and hand features of each hand are fused into face features of the target face, so as to obtain a first interaction feature.

The above-mentioned step one and step two provide a process for obtaining the first interaction feature of the target face. The features of the other body parts and the hand features of the hand in the images to be detected are fused into the face features of the target face, so that the first interaction feature can characterize the body features around the target face.

In a third step, a second interaction feature is determined on the basis of the hand feature of the target hand, the body feature set, and the face feature set.

Here, in a case where the image to be detected further includes other body parts, for each hand, the hand is taken as a target hand, a node corresponding to the target hand is taken as a center, each face is connected to each of the nodes corresponding to other body parts, so as to construct a second undirected graph. The second undirected graph is input into a GAT, and body features and face features of each face are fused into hand features of the target hand, so as to obtain a second interaction feature.

The above-mentioned step three and step two are performed at the same time. The features of the other body parts and the face features of the face in the image to be detected are fused into the hand features of the target hand, so that the second interaction feature can represent the body features around the target hand in the image to be detected, which is beneficial to improving the accuracy of correlating the target face and the target hand.

An exemplary application of the embodiments of the present application in an actual application scenario will be described below. Taking a game place as an example, descriptions will be made with correlation of a body and hand of a player in the game place as an example.

A body and hand correlation algorithm has a relatively high application value in a scenario, such as the game place. In a complex scene such as the game place, the number of bodies in a field of view is relatively large, and conditions that arms are staggered are usually complex, so it is difficult to obtain a good prediction result using the body and hand correlation algorithm or a key point detection algorithm.

In the related art, first, detection boxes of the hand and the body are acquired by using a Faster RCNN framework. Then, some pairs of hands and bodies are selected randomly, and are spliced by using corresponding visual features. Finally, a classifier is trained on the basis that whether the corresponding pair of body and hand belongs to the same person. In this way, regional visual features of faces and hands are used in a correlation prediction network. Under this condition, the features are not closely related to the surrounding of the picture, while in correlation matching, image information between the faces and the hands are often needed.

On the basis, the embodiments of the present application adopt the face-hand correlation based on GAT feature weighting. In the correlation prediction, a graph may be constructed for the whole body. Each body part represents one node. Weighting between nodes is performed on the features of the face and the hand by utilizing the GAT, so that the features of the face and the hand represent the information of surrounding bodies more effectively, thereby optimizing the prediction accuracy of correlation. This may be implemented through the following process.

In a first step, face and hand detection is performed on an image.

Figure 3:
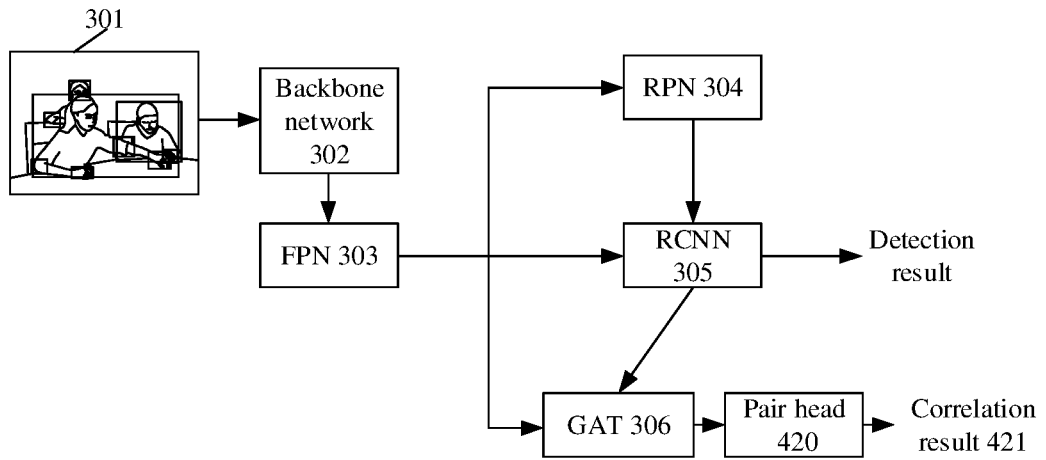
FIG. 3 is a schematic diagram of a training framework of a face-hand correlation network model according to an embodiment of the present application.

Face, hand, and body part detection is performed first on the basis of a Faster-RCNN detection framework, so as to obtain detection box coordinate information corresponding to the face, the hand, and the various parts of a body, and regional visual features of various parts of the body are extracted. A network model for predicting whether a face and a hand in an image is as shown in FIG. 3. FIG. 3 is a schematic diagram of a training framework of a network model for face and hand correlation of an embodiment of the present application. It can be seen from FIG. 3 that a training process of the network model includes the following operations.

First, an image 301 is input into a backbone network 302 for extracting features to obtain image features.

Second, the image features are input into an FPN 303 for processing the image features, so as to obtain the image features including a plurality of image features including different resolutions.

In some possible implementations, firstly, feature extraction is performed on an image from bottom to top by using the FPN. Secondly, up-sampling is performed on an extracted high-level feature map from top to bottom. Thirdly, an up-sampled result is fused with a feature graph with the same size generated from bottom to top through transverse connection, and also, a low-resolution feature map is subjected to twice up-sampling (or, nearest neighbor up-sampling). Finally, up-sampling map and corresponding bottom-up map are merged by adding by element. This process is iterative until a final resolution map is generated, i.e., the image features are obtained.

In other embodiments, feature extraction may also be performed on a plurality of images by acquiring a plurality of images at different resolutions of an image to be processed, so as to obtain an image feature set including a plurality of image features with different resolutions. For example, the image is converted into a plurality of images at different resolutions. The number of the different resolutions may be set to match the number of layers of the FPN, i.e., if there are 4 layers of the FPN, then 5 different resolutions from large to small may be set. In one specific example, the image to be processed may be scaled by using a fixed scaling, so as to obtain a plurality of image features with different resolutions.

Then, a plurality of image features at different resolutions output from the FPN 303 are input into a Region Proposal Network (RPN) 304, so as to obtain a region candidate box that represents that a hand or a face may exist.

Then, a plurality of image features at different resolutions and the region candidate box are input into an RCNN 305 to perform target detection, so as to detect whether a region candidate includes a face or a hand to obtain detection boxes of the face and the hand.

Finally, the detection boxes of the face and the hand are input into a GAT 306, and then step two is executed.

In a second step, interactive computation is performed on the features by using the GAT.

Figure 4:
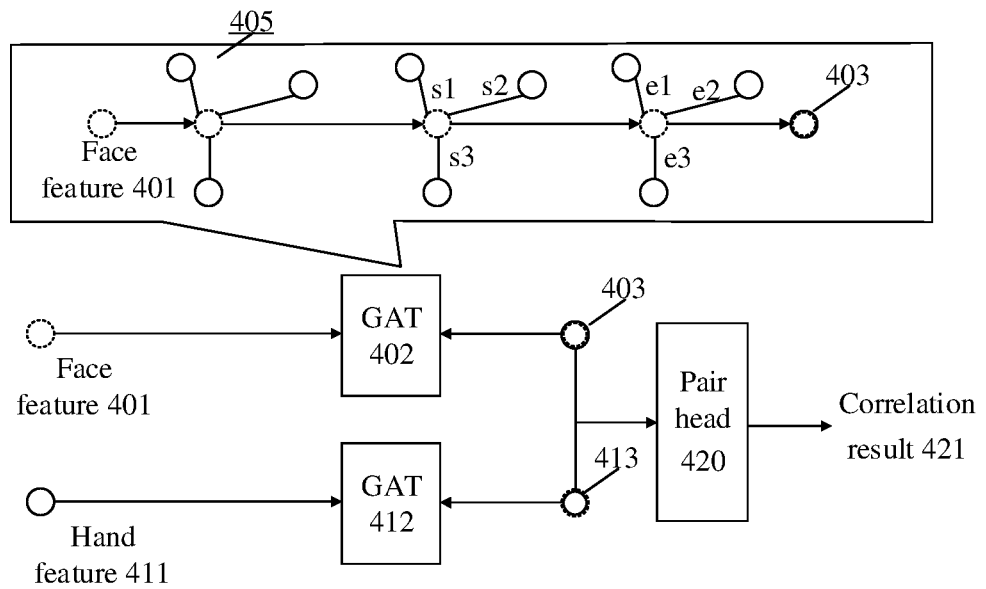
FIG. 4 is a schematic diagram of an implementation framework of a GAT provided by an embodiment of the present application.

In some embodiments, firstly, graphs, undirected graphs of the parts that need to be correlated in body parts, are constructed for various parts of a body in an image, and each part is taken as a node. Secondly, the weight between every two nodes is predicted by using a fully connected layer and a Leaky activation function. Thirdly, all sides in the graph are normalized, weights are calculated and normalized by using a softmax function. Finally, each node is weighted by utilizing the weights to represent the features of the current node. An implementation process of the GAT 306 is as shown in FIG. 4. FIG. 4 is a schematic diagram of an implementation framework of a GAT provided by an embodiment of the present application.

First, a face feature 401 with a feature dimension 3136 is input into a GAT 402 to obtain a first interaction feature 403 with the dimension of 3136. The first interaction feature 403 represents the correlation degree between one face and other hands. Meanwhile, a hand feature 411 with a feature dimension 3136 is input into the GAT 412 to obtain a second interaction feature 413 with the dimension of 3136. The second interaction feature 413 represents the correlation degree between one hand and other faces.

In some embodiments, a process for processing the input face feature 401 by the GAT 402 is as shown in block 404. An undirected graph 405 represents the connection between one face feature and three hand features. Firstly, a hand feature and a face feature connected to each side are input into the fully connected layer and the Leaky activation function to predict the weight between the hand feature and the face feature on the side, so as to obtain the weights of three sides as S1, S2, and S3 respectively. Then, S1, S2, and S3 are normalized to correspondingly obtain e1, e2, and e3. Finally, element-by-element multiplication is performed on ei (i=1, 2, 3) and the features on the corresponding sides to obtain a first interactive feature. For example, first, element-by-element multiplication is performed on e1 and the hand features connected to corresponding sides, element-by-element multiplication is performed on e2 and the hand features connected to corresponding sides, and element-by-element multiplication is performed on e3 and the hand features connected to corresponding sides. Then, the summation result is summed with a face feature and the summation result is divided by 2, to obtain a first interaction feature. The first interaction feature can effectively represent surrounding features of the face feature.

Then, the first interaction feature and the second interaction feature are input into a Pair head 420, so as to obtain a correlation result 421 representing that whether a face and a hand belong to the same body, and then step three is executed.

In a third step, features passing through a GAT model are sent into the Pair head 420 to predict to obtain a correlation result 421.

In a specific example, the image to be detected is an image collected in a game place. The face is a body of the player, and the hand is a hand of the player. Through the above-mentioned step one and step three, firstly, faces and hands in an image to be detected are detected, face features of the face of each player are determined to obtain a face feature set, and hand features of the hand of each player are determined to obtain a hand feature set. Secondly, a first undirected graph taking a target face as a center and a second undirected graph taking a target hand as a center are respectively constructed on the basis of a detection box of the detected hand and a detection box of the detected face. Thirdly, the first undirected graph and the second undirected graph are respectively input into the GAT, the hand features of each hand and features of other body parts are respectively fused into the face features of the target face, and the face features of each face and features of other body parts are respectively fused into the hand features of the target hand. Thus, the obtained first interaction feature and second interaction feature can effectively represent the information of other identity parts in the image. Finally, the first interaction feature and the second interaction feature are input into the Pair head to predict whether the target face and the target hand belong to the same body. Thus, the player hand and face in the complex game place may be matched to monitor game currency placement or payment of the player or other processes in a game process more effectively.

In the embodiments of the present application, when the information feature of the image is used, interaction between face and hand region features and surrounding features is increased, so that the face and hand features effectively express the surrounding features. Thus, when face and hand regional visual features are used, weighting among nodes of various parts of a body is performed on the features of the face and the hand by using the GAT, so that the features of the face and the hand represent the information around the body more effectively, thereby optimizing the prediction accuracy of correlation.

Figure 5:
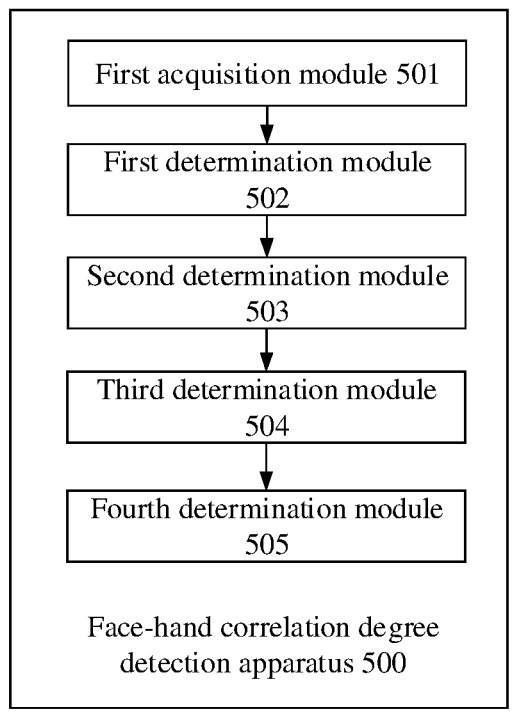
FIG. 5 is a schematic diagram of composition structures of a face-hand correlation degree detection apparatus according to an embodiment of the present application.

The embodiments of the present application provide a face-hand correlation degree detection apparatus. FIG. 5 is a schematic diagram of composition structures of a face-hand correlation degree detection apparatus according to an embodiment of the present application. As shown in FIG. 5, an face-hand correlation degree detection apparatus 500 includes: a first acquisition module 501, a first determination module 502, a second determination module 503, a third determination module 504, and a fourth determination module 505.

The first acquisition module 501 is configured to acquire an image to be detected.

The first determination module 502 is configured to determine a face feature set and a hand feature set of the image to be detected on the basis of a result obtained by performing face and hand detection on the image to be detected. Each face feature in the face feature set corresponds to one face in a picture of the image to be detected. Each hand feature in the hand feature set corresponds to one hand in the picture of the image to be detected.

The second determination module 503 is configured to determine a first interaction feature of a target face on the basis of a face feature of the target face and the hand feature set. The target face is any face in the picture of the image to be detected.

The third determination module 504 is configured to determine a second interaction feature of a target hand on the basis of a hand feature of the target hand and the face feature set. The target hand is any hand in the picture of the image to be detected.

The fourth determination module 505 is configured to determine a correlation between the target face and the target hand on the basis of the first interaction feature and the second interaction feature.

In some embodiments, the first determination module 502 includes a first determination submodule, a first extraction submodule, and a second extraction submodule.

The first determination submodule is configured to determine a face detection box of each face and a hand detection box of each hand in the picture of the image to be detected on the basis of the result obtained by performing face and hand detection on the image to be detected.

The first extraction submodule is configured to extract a feature of each face based on the face detection box of each face to obtain the face feature set.

The second extraction submodule is configured to extract a feature of each hand based on the hand detection box of each hand to obtain the hand feature set.

In some embodiments, the second determination module 503 includes a first construction submodule, a second determination submodule, and a third determination submodule.

The first construction submodule is configured to construct a first undirected graph on the basis of the target face and the each hand in the picture, the first undirected graph including a first node corresponding to the target face, a second node in one-to-one correspondence with each hand, and a first side in one-to-one correspondence with the second node, each first side being configured to connect the first node and one of the second nodes.

The second determination submodule is configured to a first correlation degree between a hand feature of the hand corresponding to the second node connected to each first side and the face feature of the target face in the first undirected graph.

The third determination submodule is configured to determine the first interaction feature on the basis of the face feature of the target face, the hand feature of each hand in the picture, and the corresponding first correlation degree.

In some embodiments, the second determination submodule includes a first determination unit and a first normalization unit.

The first determination unit is configured to determine a first confidence degree that the hand corresponding to the second node connected to each first side and the target face belong to the same body on the basis of the hand feature of the hand corresponding to the second node connected to each first side and the face feature of the target face.

The first normalization unit is configured to normalize the first confidence degree that the hand corresponding to the second node connected to each first side and the target face in the first undirected graph belong to the same body, to obtain the first correlation degree between the hand feature of the hand corresponding to the second node connected to each first side and the face feature of the target face.

In some embodiments, the third determination submodule includes a first adjustment unit and a first fusion unit.

The first adjustment unit is configured to adjust the hand feature of each hand on the basis of the first correlation degree corresponding to each hand, to obtain an adjusted feature of each hand.

The first fusion unit is configured to fuse the adjusted feature of each hand in the picture and the face feature of the target face to obtain the first interaction feature.

In some embodiments, the third determination module 504 includes a second construction submodule, a fourth determination submodule, and a fifth determination submodule.

The second construction submodule is configured to construct a second undirected graph on the basis of the target hand and each face in the picture, the second undirected graph including a third node corresponding to the target hand, a fourth node in one-to-one correspondence with each face, and a second side in one-to-one correspondence with the fourth node, each second side being configured to connect the third node and one of fourth nodes.

The fourth determination submodule is configured to determine a second correlation degree between a face feature of the face corresponding to the fourth node connected to each second side and the hand feature of the target hand in the second undirected graph.

The fifth determination submodule is configured to determine the second interaction feature on the basis of the hand feature of the target hand, the face feature of each face in the picture, and the corresponding second correlation degree.

In some embodiments, the fourth determination submodule includes a second determination unit and a first normalization unit.

The second determination unit is configured to determine a second confidence degree that the face corresponding to the fourth node connected to each second side and the target hand belong to the same body on the basis of the face feature of the face corresponding to the fourth node connected to each second side and the hand feature of the target hand.

The first normalization unit is configured to normalize the second confidence degree that the face corresponding to the fourth node connected to each second side and the target hand in the second undirected graph belong to the same body, so as to obtain the second correlation degree between the face feature of the face corresponding to the fourth node connected to each second side and the hand feature of the target hand.

In some embodiments, the fifth determination submodule includes a second adjustment unit and a second fusion unit.

The second adjustment unit is configured to adjust the face feature of the each face on the basis of the second correlation degree corresponding to the each face, to obtain an adjusted feature of each face.

The second fusion unit is configured to fuse the adjusted feature of each face in the picture and the hand feature of the target hand to obtain the second interaction feature.

In some embodiments, the fourth determination module 505 includes a sixth determination submodule and a seventh determination submodule.

The sixth determination submodule is configured to determine a third confidence degree that a target face and a target hand belong to the same body on the basis of the first interaction feature and the second interaction feature.

The seventh determination submodule is configured to determine the third confidence degree as the correlation degree between the target face and the target hand.

In some embodiments, in a case where the image to be detected further includes other body parts, the apparatus may further include a fifth determination module.

The fifth determination module is configured to determine a body feature set of other body parts of the image to be detected on the basis of the result obtained by performing detection of the other body parts on the image to be detected. Each body feature in the body feature set corresponds to one other body part in the picture of the image to be detected, the other body parts are body parts other than face and hand.

The second determination module is further configured to determine the first interaction feature on the basis of a face feature of the target face, the body feature set, and the hand feature set.

The third determination module is further configured to perform the following operation.

The second interaction feature is determined on the basis of the hand feature of the target hand, the body feature set, and the face feature set.

It is to be noted that the above descriptions about the apparatus embodiments are similar to descriptions about the method embodiments and beneficial effects similar to those of the method embodiments are achieved. Technical details undisclosed in the apparatus embodiments of the present application may be understood with reference to the descriptions about the method embodiments of the present application.

It is to be noted that, in the embodiments of the present application, when implemented in form of a software functional module and sold or used as an independent product, the above-mentioned face-hand correlation degree detection method may also be stored in a computer readable storage medium. Based on such an understanding, the embodiments of the present application substantially or parts making contributions to the related art may be embodied in a form of a software product. The computer software product is stored in a storage medium, including a plurality of instructions configured to enable a computer device (which may be a terminal, a server, etc.) to execute all or part of the method in each embodiment of the present application. The above-mentioned storage medium includes: various media capable of storing program codes, such as a USB flash drive, a mobile hard disc, a Read-Only Memory (ROM), a magnetic disc, or a compact disc. Therefore, the embodiments of the present application are not limited to any specific hardware and software combination.

The embodiments of the present application further provide a computer program product. The computer program product includes a computer executable instruction. The computer executable instruction can implement the face-hand correlation degree detection method provided by the embodiments of the present application after being executed.

The embodiments of the present application further provide a computer storage medium. The computer storage medium stores a computer executable instruction. The computer executable instruction can implement the face-hand correlation degree detection method provided by the embodiments when the executable instruction is executed by a processor.

Figure 6:
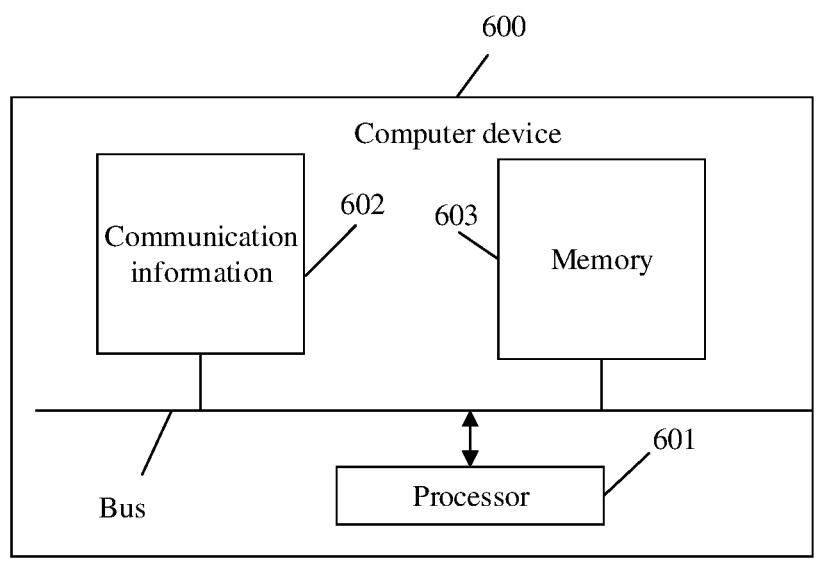
FIG. 6 is a schematic diagram of composition structures of a computer device according to an embodiment of the present application.

The embodiments of the present application provide a computer device. FIG. 6 is a schematic diagram of composition structures of the computer device according to the embodiments of the present application. As shown in FIG. 6, the computer device 600 includes a processor 601, at least one communication bus, a communication interface 602, at least one external communication interface, and a memory 603. The communication interface 602 is configured to implement connection communication among these components. The communication interface 602 may include a display screen. The external communication interface may include a standard wired interface and a standard wireless interface. The processor 601 is configured to execute an image processing program in the memory, so as to implement the face-hand correlation degree detection method provided by the above-mentioned embodiments.

The above descriptions about the face-hand correlation degree detection apparatus, the computer device, and the storage medium of the present application are similar to descriptions about the method embodiments, technical descriptions and beneficial effects similar to those of the method embodiments are achieved. Due to the limitation of space, the above-mentioned method embodiments may be recorded, so it is not described in detail herein. Technical details undisclosed in the embodiments of the face-hand correlation degree detection apparatus, the computer device, and the storage medium of the present application may be understood with reference to the descriptions about the method embodiments of the present application.

It should be understood that "one embodiment" or "an embodiment" mentioned throughout the specification means that specified features, structures, or characteristics related to the embodiment are included in at least one embodiment of this application. Therefore, "in one embodiment" or "in an embodiment" appearing throughout the specification does not necessarily refer to a same embodiment. In addition, these specified features, structures, or characteristics may be combined in one or more embodiments in any appropriate manner. It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of the present application. The sequence numbers of the embodiments of the above-mentioned application are merely for the description, and do not represent the advantages and disadvantages of the embodiments. It is to be noted that, herein, terms "include" and "contain" or any other variants thereof are intended to cover nonexclusive inclusions, so that, a process, a method, or an apparatus including a series of elements not only includes those elements but also includes other elements which are not clearly listed or further includes intrinsic elements of the process, the method or the apparatus. Under the condition of no more limitations, an element defined by a statement "including a/an" does not exclude existence of additional same elements in the process, the method, or the apparatus.

In several embodiments provided by the present application, it is to be understood that the disclosed device and method may be implemented in other manners. The device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The above-mentioned units described as separate parts may be or may not be physically separate, and the parts shown as units may be or may not be physical elements, which may be located in one place or distributed to a plurality of network elements. Part or all of the units may be selected to achieve the objectives of the embodiments according to practical requirements.

In addition, each function unit in each embodiment of the present application may be integrated into a processing unit, each unit may also serve as an independent unit and two or more than two units may also be integrated into a unit. The integrated unit may be implemented in a hardware form and may also be implemented in form of hardware and software function unit. Those of ordinary skill in the art will appreciate that: all or part of the steps of the above-mentioned method embodiments may be completed through hardware associated with program instructions. The foregoing program may be stored in a computer readable storage medium. The steps including the above-mentioned method embodiments are executed when the program is executed. The foregoing storage medium includes various media capable of storing program codes, such as a mobile storage device, a Read Only Memory (ROM), a magnetic disc or a compact disc.

Or, when implemented in form of software function module and sold or used as an independent product, the integrated unit of the present application may also be stored in a computer readable storage medium. Based on such understanding, the embodiments of the present application substantially or parts making contributions to the related art may be embodied in a form of a software product. The computer software product is stored in a storage medium, including a plurality of instructions configured to enable an electronic device (which may be a personal computer, a server, a network device, or the like) to execute all or part of the method in each embodiment of the present application. The foregoing storage medium includes: various media capable of storing program codes, such as a mobile storage device, the ROM, a magnetic disc, or a compact disc. The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the scope of protection of the present application shall be subject to the scope of protection of the claims.

What is claimed is:

1. A face-hand correlation degree detection method, comprising:
    acquiring an image to be detected;
    determining a face feature set and a hand feature set of the image to be detected on the basis of a result obtained by performing face and hand detection on the image to be detected, wherein each face feature in the face feature set corresponds to one face in a picture of the image to be detected, and each hand feature in the hand feature set corresponds to one hand in the picture of the image to be detected;
    determining a first interaction feature of a target face on the basis of a face feature of the target face and the hand feature set, wherein the target face is any face in the picture of the image to be detected, and wherein the first interaction feature is obtained by fusing the face feature of the target face with hand features, belonging to the hand feature set, of all hands in the picture of the image to be detected;
    determining a second interaction feature of a target hand on the basis of a hand feature of the target hand and the face feature set, wherein the target hand is any hand in the picture of the image to be detected, and wherein the second interaction feature is obtained by fusing the hand feature of the target hand with face features, belonging to the face feature set, of all faces in the picture of the image to be detected; and
    determining a correlation between the target face and the target hand on the basis of the first interaction feature and the second interaction feature.

2. The method of claim 1, wherein the determining a face feature set and a hand feature set of the image to be detected on the basis of a result obtained by performing face and hand detection on the image to be detected comprises:
    determining a face detection box of each face and a hand detection box of each hand in the picture of the image to be detected on the basis of the result obtained by performing the face and hand detection on the image to be detected;
    extracting a feature of the each face based on the face detection box of the each face to obtain the face feature set; and
    extracting a feature of the each hand based on the hand detection box of the each hand to obtain the hand feature set.

3. The method of claim 1, wherein the determining a first interaction feature of a target face on the basis of a face feature of the target face and the hand feature set comprises:
    constructing a first undirected graph on the basis of the target face and each hand in the picture, wherein the first undirected graph includes a first node corresponding to the target face, a second node in one-to-one correspondence with the each hand, and a first side in one-to-one correspondence with the second node, each first side is configured to connect the first node and one of second nodes;
    determining a first correlation degree between a hand feature of the hand corresponding to the second node connected to the each first side and the face feature of the target face in the first undirected graph; and determining the first interaction feature on the basis of the face feature of the target face, the hand feature of the each hand in the picture, and the corresponding first correlation degree.

4. The method of claim 3, wherein the determining a first correlation degree between a hand feature of the hand corresponding to the second node connected to the each first side and the face feature of the target face in the first undirected graph comprises:
determining a first confidence degree that the hand corresponding to the second node connected to the each first side and the target face belong to a same body on the basis of the hand feature of the hand corresponding to the second node connected to the each first side and the face feature of the target face; and
normalizing the first confidence degree that the hand corresponding to the second node connected to the each first side and the target face in the first undirected graph belong to the same body, to obtain the first correlation degree between the hand feature of the hand corresponding to the second node connected to the each first side and the face feature of the target face.

5. The method of claim 4, wherein the determining a second interaction feature of a target hand on the basis of a hand feature of the target hand and the face feature set comprises:
constructing a second undirected graph on the basis of the target hand and each face in the picture, wherein the second undirected graph includes a third node corresponding to the target hand, a fourth node in one-to-one correspondence with the each face, and a second side in one-to-one correspondence with the fourth node, each second side is configured to connect the third node and one of fourth nodes;
determining a second correlation degree between a face feature of the face corresponding to the fourth node connected to the each second side and the hand feature of the target hand in the second undirected graph; and
determining the second interaction feature on the basis of the hand feature of the target hand, the face feature of the each face in the picture, and the corresponding second correlation degree.

6. The method of claim 5, wherein the determining a second correlation degree between a face feature of the face corresponding to the fourth node connected to the each second side and the hand feature of the target hand in the second undirected graph comprises:
determining a second confidence degree that the face corresponding to the fourth node connected to the each second side and the target hand belong to a same body on the basis of the face feature of the face corresponding to the fourth node connected to the each second side and the hand feature of the target hand; and
normalizing the second confidence degree that the face corresponding to the fourth node connected to the each second side and the target hand in the second undirected graph belong to the same body, to obtain the second correlation degree between the face feature of the face corresponding to the fourth node connected to the each second side and the hand feature of the target hand.

7. The method of claim 6, wherein the determining a correlation between the target face and the target hand on the basis of the first interaction feature and the second interaction feature comprises:

determining a third confidence degree that the target face and the target hand belong to a same body on the basis of the first interaction feature and the second interaction feature; and
determining the third confidence degree as a correlation degree between the target face and the target hand.

8. The method of claim 5, wherein the determining the second interaction feature on the basis of the hand feature of the target hand, the face feature of the each face in the picture, and the corresponding second correlation degree comprises:
adjusting the face feature of the each face on the basis of the second correlation degree corresponding to the each face, to obtain an adjusted feature of the each face; and
fusing the adjusted feature of the each face in the picture and the hand feature of the target hand to obtain the second interaction feature.

9. The method of claim 3, wherein the determining the first interaction feature on the basis of the face feature of the target face, the hand feature of the each hand in the picture, and the corresponding first correlation degree comprises:
adjusting the hand feature of the each hand on the basis of the first correlation degree corresponding to the each hand, to obtain an adjusted feature of the each hand; and
fusing the adjusted feature of the each hand in the picture and the face feature of the target face to obtain the first interaction feature.

10. The method of claim 1, in a case where the image to be detected further includes other body parts, further comprising:
determining a body feature set of the other body parts of the image to be detected on the basis of a result obtained by performing detection of the other body parts on the image to be detected, wherein each body feature in the body feature set corresponds to one of the other body parts in a picture of the image to be detected, the other body parts are body parts other than face and hand;
wherein the determining a first interaction feature of a target face on the basis of a face feature of the target face and the hand feature set comprises:
determining the first interaction feature on the basis of the face feature of the target face, the body feature set, and the hand feature set;
wherein the determining a second interaction feature of a target hand on the basis of a hand feature of the target hand and the face feature set comprises:
determining the second interaction feature on the basis of the hand feature of the target hand, the body feature set, and the face feature set.

11. A non-transitory computer readable storage medium, storing a computer executable instruction, wherein the computer executable instruction is executed to:
acquire an image to be detected;
determine a face feature set and a hand feature set of the image to be detected on the basis of a result obtained by performing face and hand detection on the image to be detected, wherein each face feature in the face feature set corresponds to one face in a picture of the image to be detected, and each hand feature in the hand feature set corresponds to one hand in the picture of the image to be detected;
determine a first interaction feature of a target face on the basis of a face feature of the target face and the hand feature set, wherein the target face is any face in the picture of the image to be detected, and wherein the first interaction feature is obtained by fusing the face feature of the target face with hand features, belonging to the hand feature set, of all hands in the picture of the image to be detected;

determine a second interaction feature of a target hand on the basis of a hand feature of the target hand and the face feature set, wherein the target hand is any hand in the picture of the image to be detected, and wherein the second interaction feature is obtained by fusing the hand feature of the target hand with face features, belonging to the face feature set, of all faces in the picture of the image to be detected; and determine a correlation between the target face and the target hand on the basis of the first interaction feature and the second interaction feature.

12. A computer device, comprising a memory and a processor, wherein the memory stores a computer executable instruction, and wherein when executing the computer executable instruction on the memory, the processor is configured to:

acquire an image to be detected;

determine a face feature set and a hand feature set of the image to be detected on the basis of a result obtained by performing face and hand detection on the image to be detected, wherein each face feature in the face feature set corresponds to one face in a picture of the image to be detected, and each hand feature in the hand feature set corresponds to one hand in the picture of the image to be detected;

determine a first interaction feature of a target face on the basis of a face feature of the target face and the hand feature set, wherein the target face is any face in the picture of the image to be detected, and wherein the first interaction feature is obtained by fusing the face feature of the target face with hand features, belonging to the hand feature set, of all hands in the picture of the image to be detected;

determine a second interaction feature of a target hand on the basis of a hand feature of the target hand and the face feature set, wherein the target hand is any hand in the picture of the image to be detected, and wherein the second interaction feature is obtained by fusing the hand feature of the target hand with face features, belonging to the face feature set, of all faces in the picture of the image to be detected; and determine a correlation between the target face and the target hand on the basis of the first interaction feature and the second interaction feature.

13. The computer device of claim 12, wherein when determining the face feature set and the hand feature set of the image to be detected on the basis of the result obtained by performing the face and hand detection on the image to be detected, the processor is configured to:

determine a face detection box of each face and a hand detection box of each hand in the picture of the image to be detected on the basis of the result obtained by performing the face and hand detection on the image to be detected;

extract a feature of the each face based on the face detection box of the each face to obtain the face feature set; and extract a feature of the each hand based on the hand detection box of the each hand to obtain the hand feature set.

14. The computer device of claim 12, wherein when determining the first interaction feature of the target face on the basis of the face feature of the target face and the hand feature set, the processor is configured to:

construct a first undirected graph on the basis of the target face and each hand in the picture, wherein the first undirected graph includes a first node corresponding to the target face, a second node in one-to-one correspondence with the each hand, and a first side in one-to-one correspondence with the second node, each first side is configured to connect the first node and one of second nodes;

determine a first correlation degree between a hand feature of the hand corresponding to the second node connected to the each first side and the face feature of the target face in the first undirected graph; and determine the first interaction feature on the basis of the face feature of the target face, the hand feature of the each hand in the picture, and the corresponding first correlation degree.

15. The computer device of claim 14, wherein when determining the first correlation degree between the hand feature of the hand corresponding to the second node connected to the each first side and the face feature of the target face in the first undirected graph, the processor is configured to:

determine a first confidence degree that the hand corresponding to the second node connected to the each first side and the target face belong to a same body on the basis of the hand feature of the hand corresponding to the second node connected to the each first side and the face feature of the target face; and normalize the first confidence degree that the hand corresponding to the second node connected to the each first side and the target face in the first undirected graph belong to the same body, to obtain the first correlation degree between the hand feature of the hand corresponding to the second node connected to the each first side and the face feature of the target face.

16. The computer device of claim 15, wherein when determining the second interaction feature of the target hand on the basis of the hand feature of the target hand and the face feature set, the processor is configured to:

construct a second undirected graph on the basis of the target hand and each face in the picture, wherein the second undirected graph includes a third node corresponding to the target hand, a fourth node in one-to-one correspondence with the each face, and a second side in one-to-one correspondence with the fourth node, each second side is configured to connect the third node and one of fourth nodes;

determine a second correlation degree between a face feature of the face corresponding to the fourth node connected to the each second side and the hand feature of the target hand in the second undirected graph; and determine the second interaction feature on the basis of the hand feature of the target hand, the face feature of the each face in the picture, and the corresponding second correlation degree.

17. The computer device of claim 16, wherein when determining the second correlation degree between the face feature of the face corresponding to the fourth node connected to the each second side and the hand feature of the target hand in the second undirected graph, the processor is configured to:

determine a second confidence degree that the face corresponding to the fourth node connected to the each second side and the target hand belong to a same body on the basis of the face feature of the face corresponding to the fourth node connected to the each second side and the hand feature of the target hand; and normalize the second confidence degree that the face corresponding to the fourth node connected to the each second side and the target hand in the second undirected graph belong to the same body, to obtain the second correlation degree between the face feature of the face corresponding to the fourth node connected to the each second side and the hand feature of the target hand.

18. The computer device of claim 17, wherein when determining the correlation between the target face and the target hand on the basis of the first interaction feature and the second interaction feature, the processor is configured to:

determine a third confidence degree that the target face and the target hand belong to a same body on the basis of the first interaction feature and the second interaction feature; and determine the third confidence degree as a correlation degree between the target face and the target hand.

19. The computer device of claim 16, wherein when determining the second interaction feature on the basis of the hand feature of the target hand, the face feature of the each face in the picture, and the corresponding second correlation degree, the processor is configured to:

adjust the face feature of the each face on the basis of the second correlation degree corresponding to the each face, to obtain an adjusted feature of the each face; and fuse the adjusted feature of the each face in the picture and the hand feature of the target hand to obtain the second interaction feature.

20. The computer device of claim 14, wherein when determining the first interaction feature on the basis of the face feature of the target face, the hand feature of the each hand in the picture, and the corresponding first correlation degree, the processor is configured to:

adjust the hand feature of the each hand on the basis of the first correlation degree corresponding to the each hand, to obtain an adjusted feature of the each hand; and fuse the adjusted feature of the each hand in the picture and the face feature of the target face to obtain the first interaction feature.

* * * * *